United States Patent [19]

Ando

[11] Patent Number: 5,036,329
[45] Date of Patent: Jul. 30, 1991

[54] GPS SATELLITE SIGNAL TRACKING METHOD FOR GPS RECEIVERS

[75] Inventor: Hitoshi Ando, Saitama, Japan

[73] Assignee: Pioneer Electronic Corporation, Tokyo, Japan

[21] Appl. No.: 573,761

[22] Filed: Aug. 28, 1990

[30] Foreign Application Priority Data

Nov. 22, 1989 [JP] Japan .................................. 1-301914

[51] Int. Cl.$^5$ .............................................. G01S 5/02
[52] U.S. Cl. ...................................... 342/357; 342/386
[58] Field of Search .................... 342/357, 386; 375/1; 364/443

[56] References Cited

U.S. PATENT DOCUMENTS 4,578,678  5/1986  Hurd .................................... 342/357
4,785,463 11/1988  Janc et al. ........................ 342/386 X Primary Examiner—Mark Hellner
Attorney, Agent, or Firm—Sughrue, Mion, Zinn, Macpeak & Seas

[57] ABSTRACT

When reception of satellite signals is lost, for example, one minute, satellite signals are searched firstly in accordance with a narrow-band search mode by varying a search frequency within a range of Doppler frequency shift estimated by a moving speed of a GPS receiver, for example, ±600 Hz for a vehicle-mounted GPS receiver, for a duration which is determined by dividing a capture range (±150 Hz) by a rate of Doppler shift (40 Hz/sec) and, secondly, switching over the search mode from the narrow-band search to a wide-band search if recapturing of the satellite signal is failed through the narrow-band search within the predetermined duration (3 minutes 45 seconds) for recapturing the lost satellite signals, and thereby providing a expeditious two-step search method for decreasing a time required in recapturing the lost satellite signals.

9 Claims, 4 Drawing Sheets

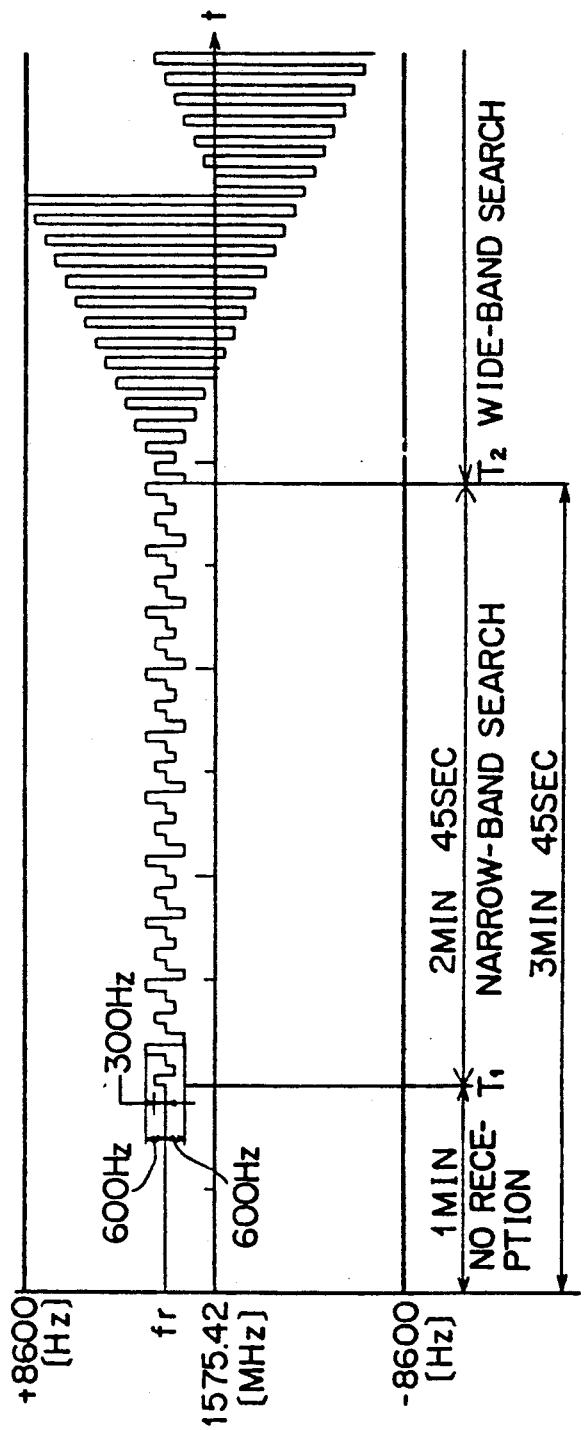

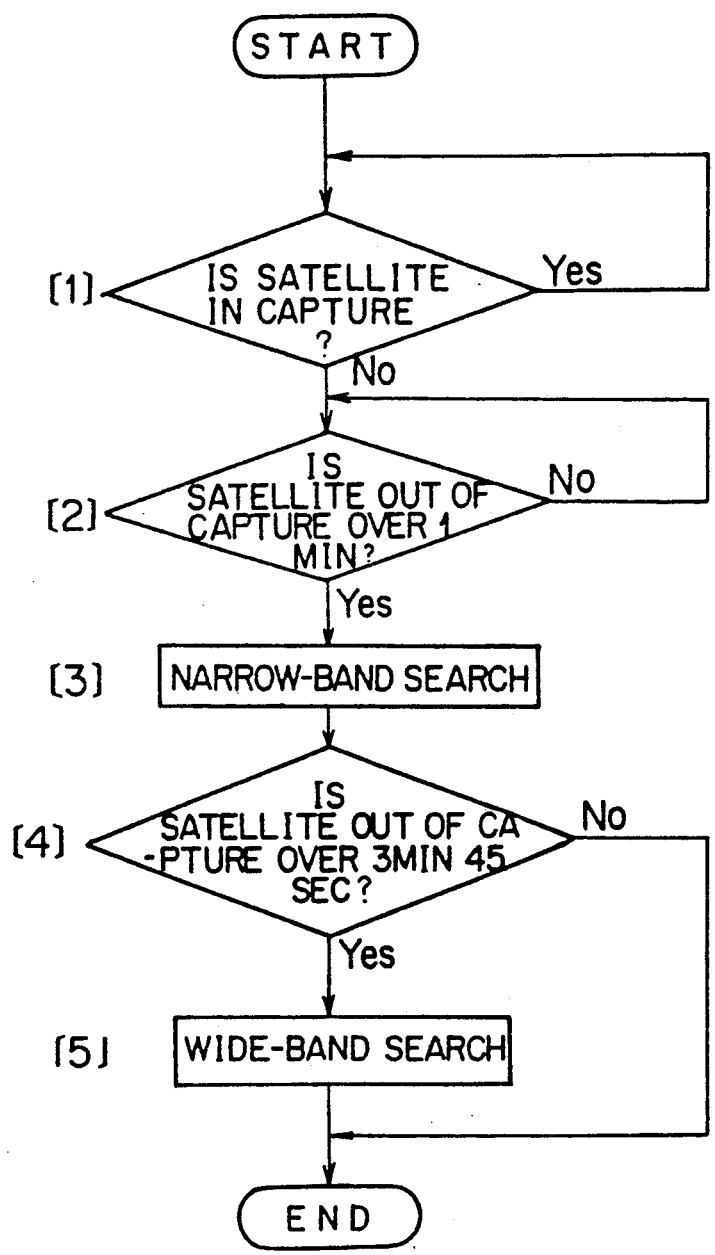

GPS SATELLITE SIGNAL TRACKING METHOD FOR GPS RECEIVERS

BACKGROUND OF THE INVENTION

1. Field of the Invention

The present invention relates to a method of tracking satellite signals for Global Positioning System (GPS) receivers.

2. Description of the Invention

Positioning system currently in service utilizing artificial satellite include a so-called Global Positioning System (GPS). This positioning system, as the name implies, will cover the entire surface of the Globe by a total of 24 geodetic satellites when all of them are operational on six orbits, approximately 20,200 km above the Earth, wherein four geodetic satellites are assigned for each orbit. Each geodetic satellite transmits a GPS signal containing navigational data for reckoning to the Earth using a spread-spectrum system. The reckoning is carried out on the ground, on the sea as well as in the air by receiving GPS signals from a plurality of geodetic satellites, for example, by receiving GPS signals from three geodetic satellites for two-dimensional positioning and that from four geodetic satellites for three-dimensional positioning. In this way, based on the navigational data contained in the GPS signal from each geodetic satellite, position information at the receiving point such as a latitude, longitude and altitude thereof can be reckoned in real time.

This GPS system was originally developed for U.S. military use, however a part of the GPS signal (C/A code) has been made available for civil use. Therefore, it is possible to build navigation systems for automobiles, ships and aircraft by using the GPS signal.

A GPS receiver used for a vehicle-mounted navigation equipment starts a search operation to recapture the GPS satellite when the vehicle enters a tunnel, for example, and the receiption of the GPS signals from the GPS satellites is interrupted for more than a specified period of time (for example, one minute). A schematic diagram for such process is shown in FIG. 1.

The GPS satellites transmsit signals on a frequency of 1575.42 MHz, however, since they are not geostationary, the receiving frequency may shift due to the Doppler effect. The Doppler frequency shift caused by the orbiting GPS satellite is about ±5 KHz on the ground.

The movement of the GPS receiver itself or, in case of a vehicle-mounted GPS receiver, the movement of the vehicle may also cause the Doppler effect. The maximum Doppler frequency shift may become ±600 Hz when the vehicle moves at a speed of 60 m/sec. There is also a frequency shift of, approximately, ±3 KHz in a oscillator of the GPS receiver. When these frequency shifts are added, the resultant total frequency shift will be 5,000+600+3,000=8,600 Hz. This means that the frequency of the received satellite signal may shift to the maximum extent of ±8,600 Hz.

Accordingly, if an attempt to recapture the lost GPS satellite is made by the GPS receiver, it is necessary for the GPS receiver to search after the satellite signal within the maximum frequency shift range of ±8,600 Hz, with the frequency of 1575.42 MHz in the center, by changing the search frequency widely.

Generally, the GPS receiver adopts a phase-locked loop (PLL) circuit in the receiving circuit in order to tune the receiving frequency of the GPS receiver accurately in the GPS satellite frequency. There is no problem if a capture range of the PLL circuit is set widely enough in covering the maximum frequency shift range of ±8,600 Hz. However, in practice, due to structural limitations of the circuit configuration, the capture range of the PLL circuit is forced to be as narrow as ±150 Hz=300 Hz.

Therefore, in order to capture the satellite signals by searching through the maximum frequency shift range of ±8,600 Hz in the receiving frequency, it is necessary to divide the search frequency of the PLL circuit into several capture ranges and perform several searching steps for covering the overall frequency range. It is assumed, for example, that one PLL capture range has an extent of ±150 Hz=300 Hz, a number of steps to be performed in searching is 8,600/300=28.66. That is, the search frequency should be switched as many as 28 steps for one side of the transmission frequency of the GPS satellite, and the total of 56 steps are required to cover the overall search range for the both sides.

As mentioned previously, since the satellite signal is transmitted in accordance with the spread-spectrum system, the received signal should be despread firstly to identify whether or not the signal received is the one transmitted from the target GPS satellite. This identifying takes about 1 second, accordingly, 56 steps of searching operation require at least 56 seconds and the essential reckoning for positioning cannot be performed within this period of time.

Furthermore, the GPS receiver needs to capture and track at least three, desirably four, GPS satellites for positioning. The most preferable configuration of the GPS receiver is to allot one receiving channel to each GPS satellite. However, this is not practical for public instruments such as a vehicle-mounted navigational equipment in terms of requirements such that accuracy in positioning, low production cost, miniaturization and the like. Therefore, a single receiving channel is employed normally in the vehicle-mounted navigational equipment, and thereby the single receiving channel is multiplexed by time-division to enable the GPS receiver to receive satellite signals from the plurality of GPS satellites in sequence. In case of recapturing, for example, N satellites for tracking by using a sequential receiving type GPS receiver, at least 56×N seconds are necessary for in making a round of the recapturing operation for all the N GPS satellites, as shown in FIG. 2.

When, for example,s the PLL search frequency is in tune to the receiving frequency of the GPS satellite, and the signal from the GPS satellite is happened to be interrupted by buildings when the vehicle comes to a halt at stop signal, it may take another 56×N seconds for the search frequency to tune in again to the GPS satellite frequency. There has been a problem for the prior art GPS receiver, in this way, as it takes a considerable time in recapturing the lost GPS satellites and restarts the reckoning for positioning with excessive delay.

It is therefore an object of this invention to eliminate the problem encountered in the prior art GPS receiver and to provide a satellite signal tracking method for a GPS receiver through which lost GPS satellite can be recaptured within the shortest possible time.

SUMMARY OF THE INVENTION

In accordance with an aspect of this invention, a satellite signal tracking method for a GPS receiver includes a step of performing a search for satellite signals by varying a PLL search frequency within the maximum frequency range of the satellite signal when the reception of a signal from the GPS satellite being tracked is interrupted for more than a specified period of time. When the satellite signals are lost, the satellite signals are searched. Firstly, for performing a narrow-band search by varying a search frequency within a range of the Doppler frequency shift predicted by a moving speed of the GPS receiver, for example, within a frequency range of ±600 Hz in the case of a vehicle-mounted GPS receiver, wherein the center of variation in the narrow-band search is allocated on the frequency at which the satellite signals have been received before losing the contact with the GPS satellites, and the narrow-band search is continued for a certain duration of time determined by dividing a PLL capture range with the rate of Doppler shift for the receiving frequency of the satellite signal. Secondly, when the satellite signals are failed to be captured through the narrow-band search, a wide-band search for the satellite signals is performed by switching the search mode from the narrow-band search to the wide-band search, wherein the wide-band search is performed by changing the PLL search frequency successively across the overall width of the maximum frequency shift range of the satellite signal receiving frequency.

In a vehicle-mounted GPS receiver embodying the present invention, the maximum frequency shift range of the satellite signal receiving frequency is around ±8,600 Hz as mentioned above. The rate of Doppler shift of the receiving frequency caused by the relative movement between the GPS satellite and the vehicle is approximately 40 Hz per minute to the maximum. One of the causes of the variation of receiving frequency is a frequency shift of an oscillator in the GPS receiver, however, the oscillating frequency of the oscillator may drift slowly during a long period of time and a rate of frequency shift is considered to be nearly zero for a short duration of time such as several minutes, therefore it is negligible as compared with the rate of Doppler shift.

If it is assumed that the PLL capture range is ±150 Hz, it may take 150/40=3 minutes 45 seconds (225 seconds) for the satellite signal receiving frequency to exceed the PLL capture range of ±150 Hz in variation.

In other words, there is very high probability of the presence of the receiving frequency within a range of ±600 Hz+±150 Hz=±750 Hz centering on the last frequency being received before elapsing the 3 minutes and 45 seconds after the interruption has occurred.

This invention is based on this fact and is characterized in that, a narrow-band search for the satellite signals is performed for a specified period of time, which is given by dividing the PLL capture range with the rate of Doppler shift of the satellite signal receiving frequency, by changing the search frequency within a range of Doppler frequency shift, which shift is predicted from a moving speed of the GPS receiver and has the last frequency in the center at which the satellite signals were lost.

If none of the GPS satellites is found within the specified period of time determined by the PLL capture range and the rate of Doppler shift as described above, there is quite a possibility that the satellite signal receiving frequency may be shifted out of the PLL capture range by the Doppler effect.

Therefore, according to this invention, when the specified period of time has elapsed, the sear mode is switched over from the narrow-band search to the wide-band search whereby the PLL search is varied within the overall width of the maximum range of variation of the satellite signal receiving frequency to search for satellite signals.

Since the narrow-band search mode is performed at first in the duration of GPS satellite search operation, the time required for the GPS receiver to recapture the lost satellite is made shorter than that of the conventional method where only the wide-band search is performed.

BRIEF DESCRIPTION OF THE DRAWINGS

FIG. 3 is a diagram showing a method of switching a search frequency embodying the present invention; and FIG. 4 is a flowchart showing operational steps as performed in the embodiment of FIG. 3.

PREFERRED EMBODIMENT OF THE INVENTION

One preferred embodiment of this invention will now be described by referring to the accompanying drawings.

FIG. 3 is a diagram showing a search frequency switching method embodying the present invention and FIG. 4 is a flowchart showing operational steps to be performed by the method of FIG. 3, whereby a GPS receiver is in a state of tracking a GPS satellite on a receiving frequency of fr.

If a vehicle carrying a GPS receiver travels behind a building while receiving signals from a desired GPS satellite on frequency fr and loses satellite signal reception (step [1] in FIG. 4) for a predetermined period of time, for example, one minute (step [2]), the GPS receiver starts the satellite recapturing or retracking operation at time T1, just one minute has passed, through a narrow-band search which characterizes the invention.

That is, by assuming a PLL capture range of the GPS receiver to be ±150 Hz=300 Hz and the rate of Doppler shift of the satellite signal receiving frequency to be 40 Hz per minutes as mentioned above, the PLL search frequency is successively changed within a narrow range of ±600 Hz having the last receiving frequency in the center, at which the satellite signals were lost by the interruption, for a duration of 2 minutes and 45 seconds from time T1 to time T2, as shown in FIG. 3, to perform a narrow-band search for satellite signals only within the range of ±600 Hz.

If the GPS satellite is found within 3 minutes 45 seconds after losing the satellit signal reception, there is no need of performing the wide-band search and thus the GPA receiver terminates the satellite recapturing operation (step [4], "no").

Figure 1:
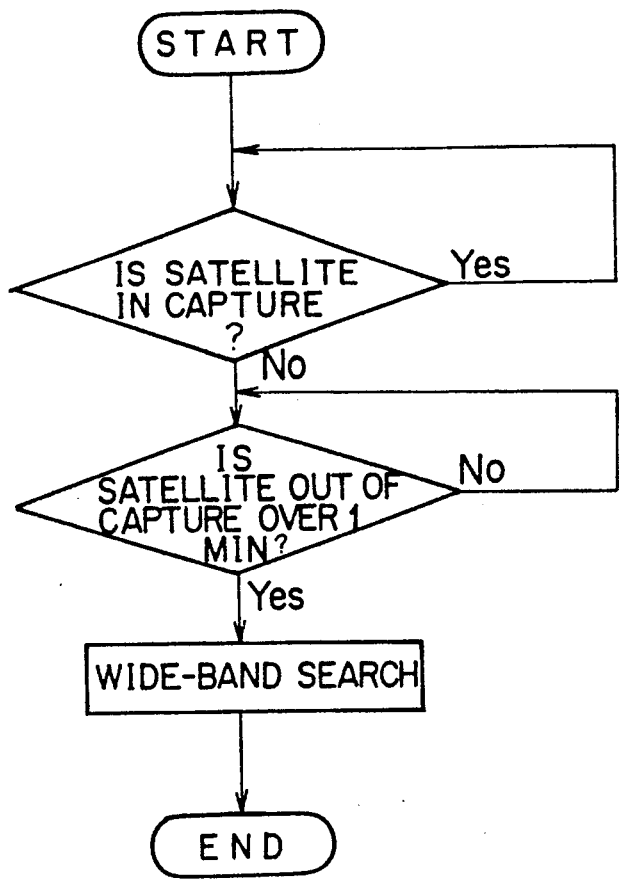
FIG. 1 is a flowchart showing operational steps as performed in a conventional method.
Figure 2:
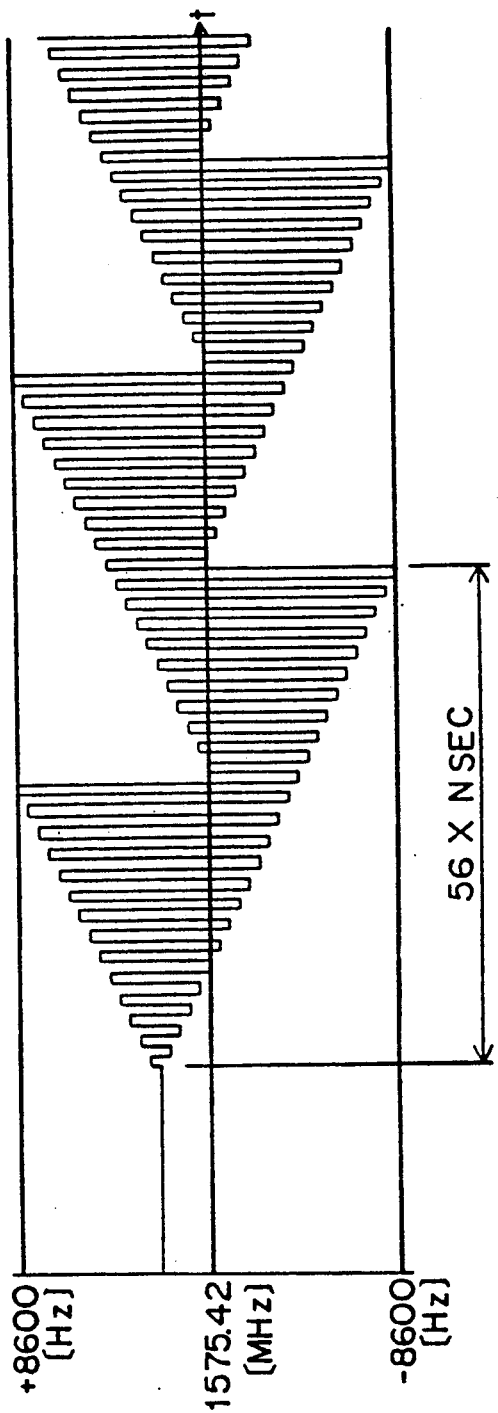
FIG. 2 is a diagram showing a conventional method of switching a search frequency.

On the other hand, if the GPS receiver fails to recapture the GPS satellite within said 3 minutes 45 seconds, the program goes to step [5] (step [4], "yes") at where the GPS receiver changes the search mode to the wide-band search as shown in FIG. 2. In the wide-band search mode, the PLL search frequency is switched successively within the maximum range of the overall receiving frequency shift of ±8,600 Hz to search for the satellite signals.

As it has been described above, according to the present invention, when the reception of the satellite signals being tracked is lost, firstly, the narrow-band search for satellite signals is performed in the duration determined by dividing the PLL capture range with the rate of Doppler shift of the satellite signal receiving frequency as by changing the search frequency within the range of Doppler frequency shift predicted by the moving speed of the GPS receiver, whereby the last frequency at which the satellite signals were lost is allocated to the center frequency thereof. Secondly, when the narrow-band search fails to recapture the satellite signals, then the search mode is switched to the wide-band search mode for recapturing the GPS satellites. This method permits expeditious recapturing of the GPS satellites and thereby allowing the GPS receiver to restart the positioning in the shortest possible time.

Although the present invention has been described in detail with reference to the presently-preferred embodiment, it should be understood by those of ordinary skilled in the art that various modifications can be made without departing from the sprit and scope of the invention. Accordingly, the invention is not to be limited except as by the appended claims.

What is claimed is:

1. A satellite signal tracking method for a GPS receiver comprising the steps of:
    performing a narrow-band search for satellite signals when the satellite signal from a GPS satellite being tracked is interrupted for more than a specified period of time; and
    switching over the narrow-band search to a wide-band search for searching the satellite signals when the narrow-band search fails to recapture any of the satellite signals within a predetermined duration of time.

2. A satellite signal tracking method for a GPS receiver as claimed in claim 1, wherein said narrow-band search is performed by changing a PLL search frequency in succession within a range of Doppler frequency shift which is predicted from a moving speed of the GPS receiver and centering on the last reception frequency of the satellite signal.

3. A satellite signal tracking method for a GPS receiver as claimed in claim 1, wherein said narrow-band search being performed in the duration determined by dividing a PLL capture range by the rate of Doppler shift of the receiving satellite signal frequency.

4. A satellite signal tracking method for a GPS receiver as claimed in claim 1, wherein said wide-band search is performed within the maximum range of the overall receiving frequency shift to search for the satellite signals.

5. A satellite signal tracking method for a GPS receiver as claimed in claim 2, wherein said range of Doppler shift is ±600 Hz.

6. A satellite signal tracking method for a GPS receiver as claimed in claim 1, wherein said specified period of time is one minute.

7. A satellite signal tracking method for a GPS receiver as claimed in claim 3, wherein said duration is 3 minutes and 45 seconds.

8. A satellite signal tracking method for a GPS receiver as claimed in claim 1, wherein said wide-band search is performed by changing the PLL search frequency successively within the maximum range of the overall receiving frequency shift to search for the satellite signals.

9. A satellite signal tracking method for a GPS receiver as claimed in claim 8, wherein said overall receiving frequency shift is ±8,600 Hz.

* * * * *